Feb. 9, 1960  W. M. RUSSELL  2,924,699
AUTOMATIC TEA-MAKING APPLIANCES
Filed Nov. 19, 1956  2 Sheets-Sheet 1
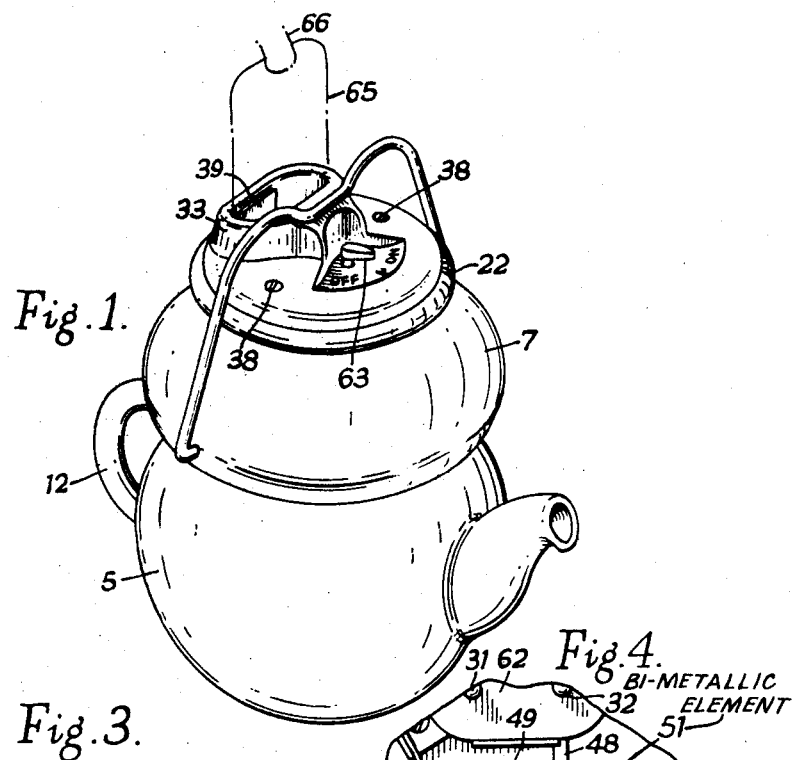
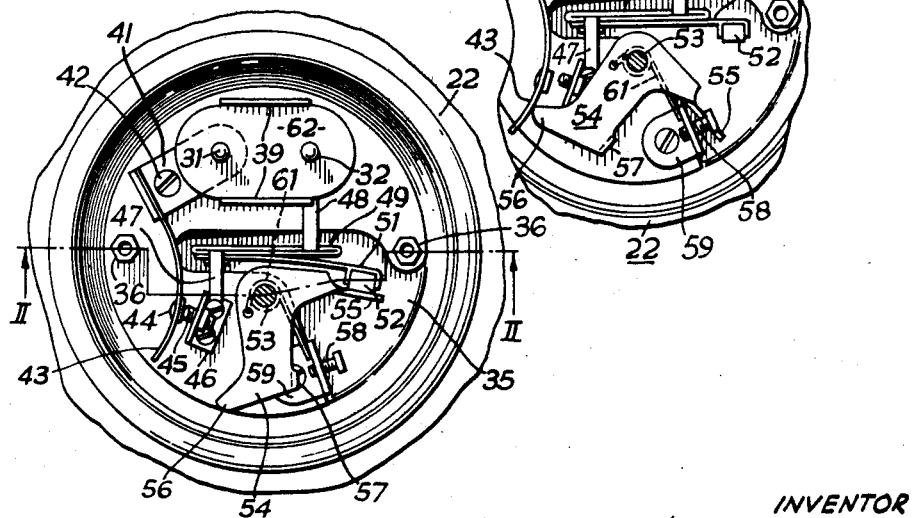
INVENTOR
William M. Russell
BY
Ralph B. Stewart
ATTORNEY Feb. 9, 1960 W. M. RUSSELL 2,924,699
AUTOMATIC TEA-MAKING APPLIANCES
Filed Nov. 19, 1956 2 Sheets-Sheet 2
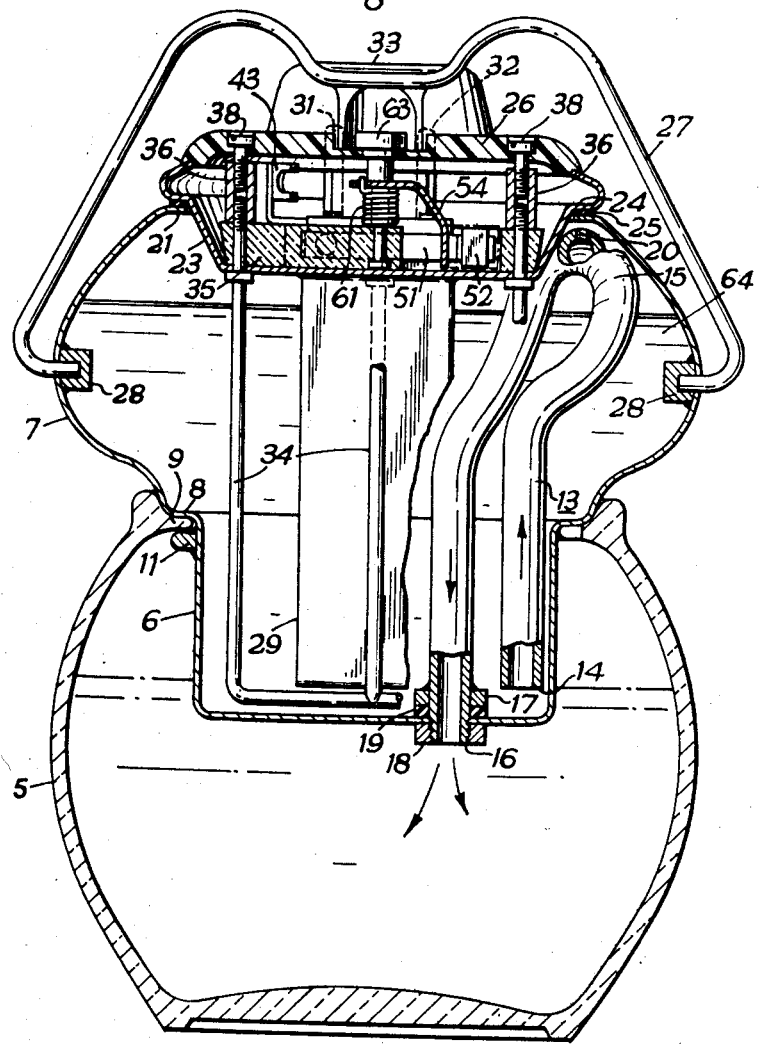
INVENTOR
William M. Russell
BY
Ralph B. Stewart
ATTORNEY

United States Patent Office 2,924,699
Patented Feb. 9, 1960

2,924,699
AUTOMATIC TEA-MAKING APPLIANCES

William Morris Russell, Merstham, England

Application November 19, 1956, Serial No. 622,990

5 Claims. (Cl. 219—44)

The present invention relates to automatic tea-making appliances.

Automatic tea-making appliances are already known in which a kettle, having a filling opening adapted to be closed in a substantially fluid-tight manner by a removable lid, is provided with a discharge tube extending upward within the kettle from an inlet opening near the base of the kettle and thence through the top of the kettle to the outside where it is curved over in the form of a swan-neck terminating in an outlet opening which is located so that it can be conveniently positioned over the filling opening of a teapot located beside the kettle. In use, steam generated when the kettle boils causes water to be displaced from the kettle and expelled through the outlet opening of the discharge tube into the teapot.

This invention has for one of its objects to provide an improved tea-making appliance which is more compact in use than known tea-making appliances in which the kettle has to be placed alongside the teapot.

The tea-making appliance according to the present invention comprises an electric kettle having a pressure-sealable casing adapted to be removably fitted into the filling opening of a teapot with a lower part of the casing depending into the interior of the teapot, the kettle being provided with a discharge tube which extends from an open inlet and located near the base of the lower part of the casing to an open outlet and projecting outward through an opening in the base or wall of said lower part and adapted in use to discharge into the upper part of the teapot.

The invention will now be described by way of example with reference to the accompanying drawings, in which:

Fig. 1 is a perspective view of a tea-making appliance.

Fig. 2 is a vertical section through the appliance taken on the line 11—11 in Fig. 3.

Fig. 3 is a fragmentary plan view of a lid part with a cover removed to show a switching arrangement in the closed-circuit position, and Fig. 4 is a detail plan view showing part of the same switching arrangement in the open-circuit position.

Referring to the drawings, a conventional ceramic teapot 5 has removably fitted, in place of the usual lid, an electric kettle. This electric kettle has a plated copper outer casing 6, 7, the lower part 6 of which is cylindrical and has a diameter slightly smaller than the diameter of the lid opening of the teapot 5, and the upper part 7 of which is ballooned out to a maximum diameter only slightly smaller than the maximum diameter of the teapot 5.

Between the lower and upper parts 6, 7 of this outer casing is formed an annular ledge 8 for supporting the electric kettle on the inturned flange 9 formed around the lid-opening of the teapot 5. The protuberance 11 is provided on the lower casing part 6 a short distance beneath the ledge 8 to engage beneath the flange 9 on the teapot. In use, this protuberance 11, which may be pressed out of the casing part 6, will normally be directed towards the handle 12 of the teapot, so that, when the teapot is tilted for pouring, the kettle will be retained in position.

As is shown in Fig. 2, the casing part 6 of the kettle depends an appreciable distance into the interior of the teapot 5.

The electric kettle is provided with a discharge tube 13 having an open inlet end 14 located close above its base. This discharge tube 13 extends upward to within a short distance of the top of the electric kettle where it is returned bent at 15 and continued downward through an opening in the base of the casing part 6, so that its outlet end 16 opens into the interior of the teapot 5. The discharge tube 13 is secured to the base of the casing part 6 by clamping nuts 17, 18 and a fibre washer 19. A small vent 20 is formed in the top of the return bent part 15 if the discharge tube 13 to prevent premature discharge of the water from the kettle into the teapot due to expansion of the air in the upper part of the kettle during the initial heating up of the water. The diameter of the small vent 20 is, of course, substantially less than that of the bore of the discharge tube.

The top of the electric kettle is formed with a lid opening surrounded by an inturned flange 21 which supports a removable lid part indicated generally by reference 22. This lid part 22 has a hollow metal casing 23 formed with an annular seating ledge 24 which rests upon the flange 21 with the interposition of a synthetic rubber sealing ring 25. A moulded synthetic plastic cover 26 is secured over the top of the lid casing 23, and the lid part 22 comprising the casing 23 and the cover 26 is detachably secured in position by a spring clip 27 in the form of a stirrup the two ends of which are engaged in bearing blocks 28 welded to two opposite sides of the casing part 7 of the kettle.

The lid part 22 supports an immersion heater 29 which is connected, via switching means to be described later, to the terminal pins 31, 32 of an electric plug socket arranged within a protective raised surround 33 on top of the cover 26.

A guard formed of wire rods 34 encloses the immersion heater 29. The upper ends of these wire rods extend upward through the base of the lid casing 23 and through a ceramic base plate 35. The base plate 35 is clamped down upon the base of the lid casing 23 by tubular nuts 36 engaging over screw-threaded parts on the upper extremities of the rods 34 and causing collars 37 on the rods 34 to be drawn up against the bottom surface of the lid casing 23. Two of these tubular nuts 36 are also engaged by screws 38 which serve for holding the cover 26 in position, and a third nut 36 is engaged by a screw securing an earth shield 39 in position within the raised surround 33.

Referring now more particularly to Figs. 3 and 4, a metal support 41 electrically connected to the socket pin 31 and secured to the base plate 35 by a screw 42 carries a resilient contact arm 43. A movable contact 44 carried by the arm 43 co-operates with a fixed contact 45 carried by a support 46. This support 46 is electrically connected by a strip metal conductor 47 to the immersion heater 29 from which the circuit is taken through a further strip metal conductor 48 to the socket pin 32. The upper part of a sheath 49 enclosing the immersion heater element serves as a fixed support for one end of a bimetallic strip 51, the other end of which carries a small permanent magnet 52. A fixed pivot pin 53 carries a rockable two-armed lever 54 one arm of which carries a mild steel blade 55 for co-operation with the small magnet 52. The other arm, which is composed of electrically insulating material, has a toe portion 56 which co-operates with the resilient contact arm 43 and an abutment portion 57 which co-operates with an adjustable stop in the form of a screw 58 engaged in a support 59 carried by the base plate 35. The two-armed lever 54 is biased by a spring 61 to rotate in the clockwise direction as seen in Figs. 3 and 4. 62 is a removable plate of electrically insulating material fitted over the terminal pins 31, 32. An On and Off control lever 63 has a tubular spindle which projects through an opening in the cover 26 and detachably engages a hub portion of the two-armed lever 54.

In use, after the required amount of tea has been ladled into the teapot 5, the kettle 6, 7, 26 is fitted into the lid opening of the latter. Having removed the lid part 22, the kettle is now filled with water 64, after which the lid part 22 is replaced and secured by means of the spring clip 27 and a plug 65 on an electric supply cable 66 is plugged into the socket formed by the surround 33. The control lever 63 is next turned to the On position, thereby rotating the two-armed lever 54 from the position shown in Fig. 4 to that shown in Fig. 3 where it will be retained by the magnet 52. The immersion heater 29 now heats the water in the kettle and as soon as the kettle boils, its contents are expelled therefrom through the discharge tube 13 into the teapot to make the tea. Subsequently, the temperature within the lid part 22 rises, the bimetallic strip 51 straightens out, drawing the two-armed lever 54 round until its abutment portion 57 engages the stop screw 58. Thereafter, the magnet 52 and the blade 55 on the lever 54 remain in contact with one another until the stress in the bi-metallic strip 51 is sufficient to overcome the attraction of the magnet 52, whereupon the bimetallic strip 51 and the two-armed lever 54, urged by its spring 61, move smartly into the positions shown in Fig. 4. As the two-armed lever 54 moves under the action of its spring 61, its toe portion 56 strikes the contact arm 43 to produce a rapid separation of the contacts 44, 45. The magnet 52 mounted on the bi-metallic strip 51 and the magnetic piece 55 carried by the spring-loaded switch-operating member 54 constitutes latch means for holding the member 54 in energy-storing position until the latch means is released by movement of the strip 51 as described above.

As soon as the immersion heater has been switched off in this manner, the tea can be poured out of the teapot with the kettle still in place; or alternatively the kettle can be removed and replaced by a conventional lid before pouring out the tea.

I claim:

1. A switch member comprising an insulated base, a pair of relatively movable switch contacts mounted on said base, a spring-loaded switch-operating member movably mounted on said base and biased to switch-opening position, a stop member mounted on the base to limit movement of the member away from switch-opening position, at least a portion of said switch-operating member being magnetic, a bi-metallic strip mounted on said base carrying a magnet in a position for cooperation with said magnetic portion to hold said movable member away from switch-opening position and against said biasing force, and to move said switch-operating member into engagement with said stop in response to increasing temperature to break the coercive force between said magnet and said magnetic portion whereby the switch-operating member will move under its biasing force to switch-opening position.

2. In combination with an electrical heater element mounted on a base, a bi-metallic strip mounted in heat exchange relation with the element and fastened at one end, a magnet carried by the strip at its free end portion, a pair of relatively movable switch contacts mounted on said base, a switch-operating member movably mounted on the base and normally biased to open said contacts, said member carrying a magnetic portion cooperating with said magnet to hold said member out of switch-opening position, and a stop on the base for limiting movement of the member away from contact-opening position, whereby movement of said bi-metallic strip due to over-heating of the element will draw said movable member against said stop in opposition to its bias and will then move the magnet away from said magnetic portion to free the member to move to contact opening position.

3. A device in accordance with claim 2 further including means for adjustably positioning said stop.

4. A device in accordance with claim 2 further including means connected to said movable member for moving it into open or closed contact position.

5. A tea-making electric kettle comprising a pressure-sealable casing adapted to be removably fitted into the filling opening of a teapot with a lower part of the casing depending into the interior of the teapot, a lid-opening in said casing, an opening in the bottom wall of the casing, a discharge tube extending from the opening upwardly to near the top of the casing and being reversely bent to terminate a slight distance from the bottom wall of the casing, a vent opening in the wall of the tube at the bend thereof and of substantially smaller diameter than that of the tube to delay discharge of the liquid from the kettle until the liquid boils, a lid for said kettle, said lid comprising an enclosed hollow casing, an immersion heating element depending from the base of said casing, electrical connections extending from the heater element outwardly through the casing and a thermostatically controlled switch in at least one of said connections for breaking said connection on being heated to a predetermined temperature, said thermostatically controlled switch comprising a bi-metallic strip mounted on the base within the hollow lid casing, a magnet carried by the strip at the free end portion, a pair of relatively movable switch contacts mounted on said base, a switch-operating member movably mounted on the base and normally biased to open said contacts, said member carrying a magnetic portion cooperating with said magnet to hold said member out of switch-opening position, and a stop on the base for limiting movement of the member away from contact-opening position, whereby movement of said bi-metallic strip due to over-heating of the element will draw said movable member against said stop in opposition to its bias and will then move the magnet away from said magnetic portion to free the member to move to contact opening position.

References Cited in the file of this patent

UNITED STATES PATENTS

| | | |
|---|---|---|
| 992,021 | Marzetti | May 9, 1911 |
| 2,004,114 | Hubbell | June 11, 1935 |
| 2,240,847 | Hildebrecht | May 6, 1941 |
| 2,287,571 | Purpura | June 23, 1942 |
| 2,290,660 | Wilcox | July 21, 1942 |
| 2,519,431 | Brown | Aug. 22, 1950 |
| 2,567,188 | Davis | Sept. 11, 1951 |
| 2,657,299 | McNairy | Oct. 27, 1953 |

FOREIGN PATENTS

| | | |
|---|---|---|
| 730,065 | France | May 3, 1932 |
| 307,233 | Italy | May 3, 1932 |
| 435,866 | Italy | May 25, 1948 |